United States Patent Office 3,201,438
Patented Aug. 17, 1965

3,201,438
METHOD OF PRODUCING A MONOESTER OF A HYDROCARBYL THIOPHOSPHONIC ACID AND A POLYALKYLENE GLYCOL
David D. Reed, Glenham, N.Y., assignor to Texaco Inc., New York, N.Y., a corporation of Delaware
No Drawing. Filed Aug. 9, 1962, Ser. No. 215,811
5 Claims. (Cl. 260—461)

This invention relates to the preparation of novel esters of a hydrocarbyl thiophosphonic acid and a polyglycol. More specifically, it relates to a process for preparation of a monoester of a hydrocarbyl thiophosphonic acid and a polyalkylene glycol in which the alkylene radical contains 2–14 carbon atoms.

In a commonly-assigned, copending application Serial No. 59,505, which was filed September 30, 1960, in the names of R. G. Lacoste, H. D. Kluge and E. E. Schallenberg, now U.S. Patent No. 3,087,956, a mono-hydroxyalkyl hydrocarbyl thiophosphonates are claimed as novel compounds. In another commonly-assigned, copending application Serial No. 63,973, now U.S. Patent No. 3,123,630, filed October 21, 1960, there is disclosed a process for preparing mono-hydroxyalkyl hydrocarbyl thiophosphonates by non-catalytic reaction of alkylene oxides with hydrocarbyl thiophosphonic acids. The subject invention is directed to novel polyglycol esters of hydrocarbyl thiophosphonic acids, their preparation by catalytic reaction and their use in lubricants.

The novel polyglycol esters of hydrocarbyl thiophosphonic acids produced by the method of this invention have the general formula

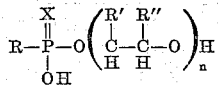

wherein R is a monovalent hydrocarbyl radical advantageously containing 12 or more carbon atoms, R' and R" are hydrogen atoms or monovalent aliphatic hydrocarbyl radicals containing 1–6 carbon atoms, X is sulfur or a mixture of sulfur and oxygen and n has a value of 2 to 10 and preferably 2 to 6.

The novel polyglycol esters of hydrocarbyl thiophosphonic acids are produced by catalytic reaction of an alkylene oxide with a hydrocarbyl thiophosphonic acid or with either a mono-hydroxyalkyl hydrocarbyl thiophosphonate which forms the subject matter of the afore-identified Serial No. 59,505 or with a previously prepared polyglycol ester of this invention. The novel polyglycol esters are also prepared by esterification of a polyglycol with a hydrocarbyl thiophosphonic acid.

Hydrocarbyl thiophosphonic acids are derived from the reaction products of aromatic hydrocarbons, cycloaliphatic hydrocarbons and aliphatic hydrocarbons with P₂S₅ at elevated temperatures. A wide variety of hydrocarbons of varying molecular weights and boiling point ranges may be used, with hydrocarbons containing 12 or more hydrocarbons being preferred. Olefins are a preferred class of hydrocarbon reactants. Lubricating oil fractions constitute another preferred class of materials for reaction with P₂S₅ to form a product which, after further treatment as outlined below, is converted to hydrocarbyl thiophosphonic acids.

The olefinic hydrocarbons reacted with P₂S₅ usually contain at least 12 carbon atoms although lower molecular weight olefins can be employed. Monoolefin polymers such as isobutylene polymer, butylene polymer, propylene polymer and copolymers of monoolefins such as propylene-isobutylene copolymer are particularly preferred materials for reaction with P₂S₅. In general, monoolefin polymers and copolymers having an average molecular weight between about 250 and 50,000 are employed with polymers and copolymers having an average molecular weight in the range from about 600 to 5000 being preferred. Copolymers of conjugated dienes and monoolefins such as a copolymer of butadiene and isobutylene having an average molecular weight in the above-described range also react with phosphorus pentasulfide. Particularly preferred olefin polymers are isobutylene polymers having average molecular weights between 600 and 5000.

Olefins useful for reaction with P₂S₅ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The reaction product obtained by reacting about 5 to about 40 percent P₂S₅ with a hydrocarbon at a temperature of from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-P₂S₅ reaction product to a hydrocarbyl thiophosphonic acid and inorganic phosphorus acids. The hydrocarbyl thiophosphonic acid has the general formula:

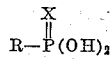

wherein R is the charge hydrocarbon radical, usually an olefinic radical containing 20 to 200 carbon atoms, and X is sulfur or a mixture of oxygen and sulfur. X in the above formula is designated as sulfur or a mixture of sulfur and oxygen because the steam hydrolysis step usually results in replacement of a portion of the sulfur joined to phosphorus with oxygen.

It is important to remove inorganic phosphorus acids formed during hydrolysis prior to reaction with the alkylene oxide. A number of different procedures are available for removal of the inorganic phosphorus acids. In U.S. 2,987,512, dated June 6, 1961, and U.S. 2,951,835, dated September 6, 1960, both of which issued to H. D. Kluge, J. W. Wisner, Jr., and R. G. Lacoste, removal of the inorganic phosphorus acids is effected by contact with synthetic hydrous alkaline earth metal silicates and synthetic hydrous alkali metal silicates, respectively. Another commonly-assigned, copending application, Serial No. 841,668, now U.S. Patent No. 3,135,729, filed September 23, 1959, by H. D. Kluge and R. G. Lacoste, describes a process wherein inorganic phosphorus acids are removed from the hydrolyzed product by extraction with anhydrous methanol.

The mono-hydroxyalkyl hydrocarbyl thiophosphonates and the previously prepared polyglycol hydrocarbyl thiophosphonates which react with alkylene oxides in the presence of a catalyst to form polyglycol hydrocarbyl thiophosphonates can be represented by the following formula

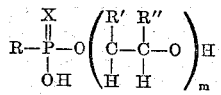

wherein R is a monovalent hydrocarbyl radical, R' and R" are selected from the group consisting of hydrogen and an alkyl radical containing 1–6 carbon atoms, X is selected from the group consisting of sulfur and a mixture of sulfur and oxygen and m has a value between 1 and 9. Where m is 1, the reactant is a mono-hydroxyalkyl hydrocarbyl thiophosphonate which forms the subject matter of the afore-identified, commonly-assigned, copending application Serial No. 59,505, now U.S. Patent No. 3,087,956. Where m in the above formula has a value between 2 and 9, the starting material is a previously prepared polyglycol ester of a hydrocarbyl thiophosphonic acid.

Alkylene oxides used in the catalytic process of this invention are represented by the general formula

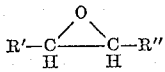

wherein R' and R" are hydrogen or an aliphatic hydrocarbyl radical containing 1–6 carbon atoms. Examples of effective olefin oxides are the following: Ethylene oxide, propylene oxide, 1,2-butylene oxide, 2,3-butylene oxide, 1,2-pentylene oxide, 2,3-pentylene oxide, 1,2-hexylene oxide, 3-methyl-1,2-pentylene oxide, 2,3-octylene oxide, 4-methyl-2,3-octylene oxide, 4-methyl-1,2-hexylene oxide and 3-methyl-1,2-butylene oxide.

The catalytic process of the invention is effected at a temperature between about 60 and 200 C. with temperatures of 80 to 150° C. being preferred. Atmospheric and superatmospheric pressures are employed for the reaction with pressures between about 10 and 500 lbs. p.s.i.g. being advantageous with the lower alkylene oxides.

Alkaline and acidic catalysts are effective in producing polyglycol hydrocarbon thiophosphonate esters by reacting alkylene oxides with hydrocarbyl thiophosphonic acids, with mono-hydroxyalkyl hydrocarbyl thiophosphonates and with previously prepared polyglycol hydrocarbyl thiophosphonates. Examples of effective alkaline catalysts are alkali metals themselves such as sodium, lithium and potassium, alkaline earth metals such as calcium and barium, alkali metal and alkaline earth metal alkoxides and aryloxides and high base strength amines such as aliphatic amines as illustrated by butylamine, t-octylamine and di-t-butylamine and heterocyclic amines such as morpholine and pyridine. Examples of effective acid catalysts for the polyalkoxylation reaction are sulfuric acid, boron trifluoride, titanium tetrachloride and phosphoric acid. In general, Lewis acids and salts of Lewis acids are effective for the preparation of novel polyglycol hydrocarbyl thiophosphonate esters by the reaction of alkylene oxides with hydrocarbyl thiophosphonic acids, mono-hydroxyalkyl hydrocarbyl thiophosphonates or previously prepared polyglycol hydrocarbon thiophosphonate esters.

The following examples illustrate the preparation of the novel polyglycol esters of hydrocarbyl thiophosphonic acids of this invention.

EXAMPLE 1

This example describes the preparation of a polybutene thiophosphonic acid from a polybutene having an average molecular weight of 940. A polybutene-$P_2S_5$ reaction product was prepared by reacting polybutene having an average molecular weight of about 940 with $P_2S_5$ in a mol ratio of polybutene to $P_2S_5$ of 1.1 and in the presence of sulfur in an amount equal to 1.3 weight percent of the polybutene. After reaction at 450° F. until the reaction product was soluble in N-pentane, the reaction product was diluted with approximately 140 weight percent of a naphthene base oil having an SUS at 100° F., steamed at 350° F. for 10 hours and then dried by passage of nitrogen therethrough at 350° F. The hydrolyzed product was extracted with 50% by volume of methyl alcohol at 140° F. to give a methanol extract containing inorganic phosphorus acids and a lubricating oil raffinate containing a polybutene thiophosphonic acid which after stripping had a Neut. No. of 18.1.

EXAMPLE 2

6,000 grams of a polybutene thiophosphonic acid prepared as in Example 1 (1.94 mols) was charged to a 5 liter, 3-necked flask equipped with a stirrer, a gas inlet tube extending below the surface of the acid reactant, a thermometer immersed in the acid and a Dewar reflux condenser cooled with a Dry Ice-acetone mixture. 11 grams (0.078 mol) of boron fluoride etherate,

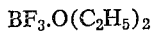

was also charged to the reaction vessel, the contents of which were then raised to approximately 200° F. while the reaction mixture was maintained at about 200° F. with stirring and nitrogen blowing at approximately 1 liter per minute. Ethylene oxide was passed through a trap in which it was mixed with nitrogen (reduced in rate to about 5–10 cc./min.) and introduced into the reaction flask at a rate to maintain a gentle reflux. After the rapid ethylene oxide uptake had ceased, reflux was continued for approximately one hour followed in turn by nitrogen blowing for an hour. For approximately ½ to ¾ of the total reaction period the reaction was exothermic, necessitating cooling to maintain the desired 200° F. reaction temperature. After stripping the product by nitrogen blowing at 200° F. for 1–2 hours, there was obtained a product having the following formula

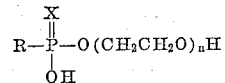

wherein R is a polybutene radical having an average molecular weight of 940, X is a mixture of oxygen and sulfur and $n$ has a value of 2.64. This product analyzed as follows:

|  | Found | Calculated |
| --- | --- | --- |
| Neut. No. | 0.54 | 0.0 |
| Percent phosphorus | 0.88 | 0.96 |
| Percent sulfur | 0.45 | [1] 0.99 |
| Hydroxyl No. | 13 | 18 |

[1] In this and subsequent analyses, calculated sulfur is on the basis that X is all sulfur.

EXAMPLE 3

3,000 grams (0.93 mol) of polyglycol polybutene thiophosphonate prepared in Example 2, 6 grams (0.042 mol) of boron fluoride etherate and 77 grams (1.75 mols) of ethylene oxide were charged to a reaction vessel and reacted by the procedure outlined in Example 2. The product isolated from the reaction mixture had the following formula

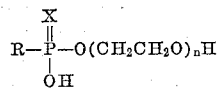

wherein R is a polybutene radical having an average molecular weight of 940, X is a mixture of oxygen and sulfur and $n$ has a value of 4.51. This product analyzed as follows:

|  | Found | Calculated |
| --- | --- | --- |
| Neut. No. | 1.07 | 0.0 |
| Percent phosphorus | 0.88 | 0.94 |
| Percent sulfur | 0.43 | 0.97 |
| Hydroxyl No. | 13 | 17 |

EXAMPLE 4

2500 grams (0.806 mol) of polybutene thiophosphonic acid prepared as in Example 1, 3 ml. (0.054 mol) of concentrated $H_2SO_4$ and 82 grams (1.86 mols) of ethylene oxide were charged to a reaction vessel and reacted by the procedure outlined in Example 2. The product isolated from the reaction mixture had the following formula

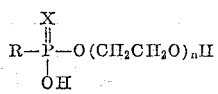

wherein R is a polybutene having an average molecular weight of 940, X is a mixture of sulfur and oxygen and $n$ has a value of 2.31. The product analyzed as follows:

|  | Found | Calculated |
| --- | --- | --- |
| Neut. No. | 0.37 | 0.0 |
| Percent phosphorus | 0.85 | 0.97 |
| Percent sulfur | 0.47 | 1.0 |
| Hydrolyl No. | 23 | 18 |

EXAMPLE 5

2500 grams (0.806 mol) of polybutene thiophosphonic acid such as in Example 1, 11 grams (0.04 mol) of stannic chloride and 127 grams (2.89 mols) of ethylene oxide were charged to a reaction vessel and reaction effected under the conditions employed in Example 2. There was isolated from the reaction product a product having the following formula

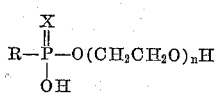

wherein R is a polybutene radical having an average molecular weight of 940, X is a mixture of oxygen and sulfur and $n$ has a value of 3.58. This product analyzed as follows:

|  | Found | Calculated |
| --- | --- | --- |
| Neut. No. | 0.53 | 0.0 |
| Percent phosphorus | 0.90 | 0.97 |
| Percent sulfur | 0.44 | 1.0 |
| Hydroxyl No. | 21 | 18 |

EXAMPLE 6

1240 grams (0.4 mol) of polybutene thiophosphonic acid prepared as in Example 1, 93 grams (1.6 mols) of propylene oxide and 2 grams (0.014 mol) of boron fluoride etherate were charged to a reaction vessel and reaction effected under conditions essentially the same as those described in Example 2 with the exception that propylene oxide was added by means of a dropping funnel. There was isolated from the reaction mixture a product having the following formula

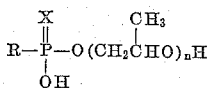

wherein R is a polybutene radical having an average molecular weight of 940, X is a mixture of sulfur and oxygen and $n$ has a value of 4. This product analyzed as follows:

|  | Found | Calculated |
| --- | --- | --- |
| Neut. No. | 0.95 | 0.0 |
| Percent phosphorus | 0.88 | 0.93 |
| Percent sulfur | 0.45 | 0.96 |
| Hydroxyl No. | 28 | 17 |

The polyglycol esters of hydrocarbyl thiophosphonic acids are effective dispersants for mineral and synthetic type lubricating oils. In finished lubricating oils, the polyglycol esters of hydrocarbyl thiophosphonic acids are employed in concentrations falling between 0.2 and 10.0 weight percent with concentrations between 1.0 and 7.0 weight percent usually being employed. In concentrates used to formulate finished lubricants, the polyglycol ester concentration is usually between 30 and 50 percent although concentrations as high as 60 percent can be used.

The novel polyglycol esters of hydrocarbyl thiophosphonic acid produced by the process of the invention are useful as dispersants in lubricants.

The hydrocarbon mineral oils usable can be paraffin base, naphthene base or mixed paraffin-naphthene base distillate or residual oils. Paraffin base distillate lubricating oil fractions are used in the formulation of premium grade motor oils such as are contemplated in this invention. The lubricating base generally has been subjected to solvent refining to improve its lubricity and viscosity temperature relationship as well as solvent dewaxing to remove waxy components and improve the pour of the oil. Broadly speaking, mineral lubricating oils having an SUS viscosity at 100° F. between 50 and 1000 may be used in the formulation of the improved lubricants of this invention but usually the viscosity range falls between 70 and 300 at 100° F.

The mineral lubricating oils containing a polyglycol ester of a hydrocarbyl thiophosphonic acid as a dispersant usually contain other additives designed to impart other desirable properties thereto. For example, VI improvers such as the polymethacrylates are normally included therein as are corrosion inhibitors and detergents.

A widely used VI improver is a polymethacrylate of the general formula

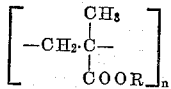

wherein R is an aliphatic radical.

The most commonly used supplementary detergent is an alkaline earth metal alkyl phenolate; barium nonyl phenolate, barium dodecyl cresolate and calcium dodecyl phenolate are examples of such detergents. These products, which are well-known detergent additives, are usually present in the lubricating oil in a concentration between 0.1 and 5.0 weight percent.

The most commonly used inhibitor and antioxidant is a divalent metal alkyl dithiophosphate resulting from the neutralization of a $P_2S_5$-alcohol reaction product with a divalent metal or divalent metal oxide. Barium and zinc alkyl dithiophosphates are the most widely used oxidation and corrosion inhibitors. Metal dialkyl dithiophosphates are usually present in the lubricant in a concentration between 0.1 and 3.0 weight percent.

Synthetic lubricating bases of the ester or ether type may also be used as the lubricating oil. High molecular weight, high boiling liquid aliphatic dicarboxylic acid esters possess excellent viscosity-temperature relationships and lubricating properties and are finding ever-increasing utilization in lubricating oils adapted for high and low temperature lubrication; esters of this type are used in the formulation of jet engine oils. Examples of this class of synthetic lubricating bases are the diesters of acids such as sebacic, adipic, azelaic, alkenyl succinic, etc.; specific examples of these diesters are di-2-ethylhexyl sebacate, di-2-ethylhexyl azelate, di-2-ethylhexyl adipate, di-n-amyl sebacate, di-2-ethylhexyl n-dodecyl succinate, di-2-ethoxyethyl sebacate, di-2'-methoxy-2-ethoxyethyl sebacate (the methyl Carbitol diester), di-2'-ethyl-2-n-butoxyethyl sebacate (the 2-ethylbutyl Cellosolve diester), di-2-n-butoxyethyl azelate (the n-butyl Cellosolve diester) and di-2'-n-butoxy-2-ethoxyethyl-n-octyl succinate (the n-butyl Carbitol diester).

Polyester lubricants formed by reaction of an aliphatic dicarboxylic acid of the type previously described, a dihydroxy compound and a monofunctional aliphatic monohydroxy alcohol or an aliphatic monocarboxylic acid in specified mol ratios are also employed as the synthetic lubricating base in the compositions of this invention; polyesters of this type are described in U.S. 2,628,974. Polyesters formed by reaction of a mixture containing specified amounts of heptanediol, sebacic acid and 2-ethylhexanol and of a mixture containing adipic acid, diethylene glycol and 2-ethylhexanoic acid illustrate this class of synthetic polyester lubricating bases.

Polyalkylene ethers as illustrated by polyglycols are also used as the lubricating base in the compositions of this invention. Polyethylene glycol, polypropylene glycol, polybutylene glycols and mixed polyethylene-polypropylene glycols are examples of this class of synthetic lubricating bases.

The sulfur analogs of the above-described diesters, polyesters and polyalkylene ethers are also used in the formulation of the lubricating compositions of this invention. Dithioesters are exemplified by di-2-ethylhexyl thiosebacate and di-n-octyl thioadipate; polyethylene thioglycol is an example of the sulfur analogs of the polyalkylene glycols; sulfur analogs of polyesters are exemplified by the reaction product of adipic acid, thioglycol and 2-ethylhexyl mercaptan.

The effectiveness of polyglycol esters of hydrocarbyl thiophosphonic acids as lubricant additives was demonstrated in the Chevrolet S–II Test and in the extended version of the Chevrolet L–4 Test which has a CRC designation of L–4–1252.

The Chevrolet S–II Test is conducted under conditions simulating low temperature operation wherein deposit formation is most pronounced. The merit system of evaluation involves visual examination of the engine parts after disassembly and their rating according to deposits by comparison with standards which have assigned ratings. Individual parts, e.g. pistons, are rated in the Chevrolet S–II Test on the systems wherein a "10" rating designates a clean part, that is, without deposits, and a rating of "0" represents the worst condition. Total engine varnish and total engine sludge are rated on a system wherein "50" designates the absence of deposits and "0" indicates the worst condition.

The Chevrolet L–4 Test is used to evaluate the performance of a motor oil under high temperature conditions where wear and corrosion are problems. In the extended Chevrolet L–4 Test, which in this instance was of 108 hours duration, the individual pistons are also rated by a merit system wherein 10 denotes a clean piston, with 0 designating the worst condition; the total engine deposits are evaluated on a system wherein 100 designates a perfectly clean engine and 0 the worst condition.

In Table I there is shown the improvement in Chevrolet S–II Test obtained by the addition of a polyethylene glycol ester of polybutene thiophosphonic acid containing 2.14 mols of ethylene oxide per mol of acid, the product prepared in Example 2. The base oil employed in this comparison designated as Lubricant A comprised 95.38 weight percent of a highly refined paraffinic distillate oil, 4.0% of a mineral oil concentrate containing 25 weight percent of a copolymer of mixed methacrylate alkyl esters in which the alkyl groups range from butyl to octadecyl and 0.62 weight percent of zinc isopropyl methylisobutylcarbinyl dithiophosphate (said latter additive giving a Zn level of 0.07%). The test lubricant designated Lubricant B was Lubricant A containing 4.65 weight percent of the previously described polyethylene glycol ester of polybutene thiophosphonic acid.

Table I.—Chevrolet S–II Test

|  | Lubricant A | Lubricant B |
|---|---|---|
| Piston varnish | 6.0 | 8.0 |
| Total engine varnish | 39.0 | 42.0 |
| Total engine sludge | 41.0 | 48.0 |
| Total rating | 80.0 | 90.0 |

The foregoing data show the improvement in low temperature varnish properties effected by the presence of a polyglycol ester of a hydrocarbyl thiophosphonic acid on a base oil containing the usual methacrylate VI improver and zinc dialkyl dithiophosphate oxidation and corrosion inhibitor.

Two SAE 10W–30 formulations containing polyethylene glycol esters of polybutene thiophosphonate as dispersants were prepared and evaluated in the Chevrolet S–II Test and one of these formulations was subjected to further evaluation in the Chevrolet L–4 Test. These lubricants, identified as Lubricant C and Lubricant D, each comprised 88.08% refined paraffinic distillate oil, 1.83% barium $C_{12}$ alkyl phenolate (equivalent to 0.3% barium), 0.87% zinc isopropyl methylisobutylcarbinyl dithiophosphate (equivalent to 1.0% zinc), 4% of a mineral oil concentrate containing 24 weight percent of a copolymer of methacrylate alkyl esters in which the alkyl groups range from butyl to octadecyl radicals and 150 p.p.m. of dimethyl silicone anti-foam concentrate. Lubricant C contained 4.65% of the polyethylene glycol ester of polybutene thiophosphonate prepared in Example 2 containing 2.64 mols of ethylene oxide per molecule. Lubricant D contained a polyethylene glycol ester of polybutene thiophosphonate of Example 3 containing 4.51 mols of ethylene oxide per molecule.

The evaluation of these SAE 10W–30 lubricants in the Chevrolet S–II Test and of Lubricant D in the Chevrolet L–4 Test is shown in the following table:

Table II.—Engine test on SAE 10W–30 motor oils

|  | Lubricant C | Lubricant D |
|---|---|---|
| Chevrolet S–II Test: |  |  |
| Piston varnish | 5.3 | 6.8 |
| Total engine varnish | 38.3 | 41.8 |
| Total engine sludge | 47.0 | 48.0 |
| Total rating | 85.3 | 89.8 |
| Chevrolet L–4 Test: |  |  |
| Piston varnish |  | 5.8 |
| Engine varnish |  | 39.8 |
| Total engine deposits |  | 86.8 |
| Bearing weight loss, 72 hrs. gms./two hole bearings |  | 0.559 |

The foregoing data show the effectiveness of the polyglycol esters of hydrocarbyl thiophosphonic acids as dispersants in motor oil formulations. The 10W–30 formulations containing polyethylene glycol esters of polybutene thiophosphonates as dispersants gave excellent performance under conditions simulating both low and high temperature operation.

I claim:

1. A process for preparing a polyglycol hydrocarbyl thiophosphonic acid ester of the formula:

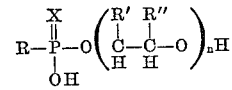

wherein R is a monovalent hydrocarbyl derived from an aliphatic polyolefin having an average molecular weight between about 250 and 50,000, R' and R" are selected from the group consisting of hydrogen and an alkyl containing 1–6 carbon atoms, X is a member selected from the group consisting of sulfur and a mixture of a major portion of sulfur and a minor portion of oxygen and $n$ has a value of 2 to 10 which comprises reacting an alkyl oxide of the formula:

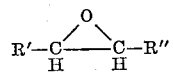

wherein R' and R" are identified as above with a compound free from inorganic phosphorous acids selected from the group having the following formulae:

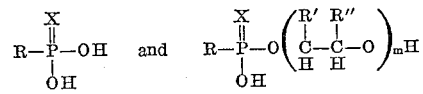

wherein R, R' and R" and X are identified as above and $m$ has a value of 1 to 9 in the presence of a catalyst selected from the group consisting of alkali metals, alkaline earth metals, butylamine, t-octylamine, di-t-butylamine, morpholine, pyridine, stannic chloride, sulfuric acid, boron trifluoride, boron trifluoride etherate, titanium tetrachloride and phosphoric acid.

2. A process in accordance with claim 1 wherein R has an average molecular weight between 600 and 5,000, R' and R'' are hydrogen and X consists of a major portion of sulfur and a minor portion of oxygen.

3. A process in accordance with claim 1 where said compound is

where R is of an average molecular weight of about 940, R' and R'' are hydrogen, and X consists of a major portion of sulfur and a minor portion of oxygen.

4. A process in accordance with claim 1 wherein said compound is

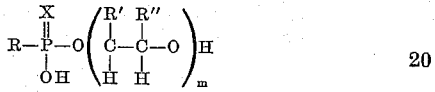

where R is of an average molecular weight of about 940, R' and R'' are hydrogen, X consists of a major portion of sulfur and minor portion of oxygen, and said catalyst is boron trifluoride etherate.

5. A process for preparing a polyglycol hydrocarbon thiophosphonic acid ester comprising:
(a) reacting $P_2S_5$ with an aliphatic polyolefin having an average molecular weight between about 250 and 50,000 at a temperature between about 100 and 320° C. in a non-oxidizing atmosphere, the $P_2S_5$ constituting between about 5 and 40 wt. percent of the reaction mass,
(b) containing the resulting $P_2S_5$-polyolefin hydrocarbon reaction mass with steam at a temperature between about 100 and 250° C. and removing formed inorganic phosphorus acids from the steam treated reaction mixture,
(c) contacting the resultant inorganic phosphorus acids removed, steam treated reaction mixture with an alkylene oxide of the formula:

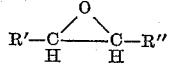

where R' and R'' are selected from the group consisting of hydrogen and alkyl containing 1 to 6 carbon atoms in the presence of a catalyst selected from the group consisting of alkali metals, alkaline earth metals, butylamine, t-octylamine, di-t-butylamine, morpholine, pyridine, sulfuric acid, boron-trifluoride etherate, titanium tetrachloride, phosphoric acid and stannic chloride at a temperature between about 60 and 200° C.

References Cited by the Examiner
UNITED STATES PATENTS

| | | | |
|---|---|---|---|
| 2,683,168 | 7/54 | Jensen et al. | 260—461 |
| 2,795,609 | 6/57 | Jensen et al. | 260—461 |
| 2,965,664 | 12/60 | Butler | 260—461 |

FOREIGN PATENTS

| | | |
|---|---|---|
| 838,928 | 6/60 | Great Britain. |

CHARLES B. PARKER, *Primary Examiner.*

MORRIS LIEBMAN, IRVING MARCUS, *Examiners.*